(12) United States Patent
Höfelsauer et al.

(10) Patent No.: US 9,453,759 B2
(45) Date of Patent: Sep. 27, 2016

(54) SYSTEM FOR DETERMINING VIBRATION CHARACTERISTICS OF A MOTOR VEHICLE

(75) Inventors: Herbert Höfelsauer, München (DE); Richard Baur, Pfaffenhofen (DE); Stefano Marzani, Reggio Emilia (IT); Francesco Lolli, Scandiano (IT)

(73) Assignee: AUTOLIV DEVELOPMENT AB, Vargarda (SE)

( * ) Notice: Subject to any disclaimer, the term of this patent is extended or adjusted under 35 U.S.C. 154(b) by 502 days.

(21) Appl. No.: 13/821,133

(22) PCT Filed: Sep. 9, 2010

(86) PCT No.: PCT/EP2010/005550
§ 371 (c)(1),
(2), (4) Date: May 17, 2013

(87) PCT Pub. No.: WO2012/031614
PCT Pub. Date: Mar. 15, 2012

(65) Prior Publication Data
US 2013/0233083 A1 Sep. 12, 2013

(51) Int. Cl.
*G01H 1/00* (2006.01)
*G01H 1/12* (2006.01)

(52) U.S. Cl.
CPC . *G01H 1/00* (2013.01); *G01H 1/12* (2013.01)

(58) Field of Classification Search
CPC ............ G01H 1/00; G01H 1/06; G01H 1/12; G01M 5/0041; G01M 5/0066; G01M 13/028
USPC ............................ 73/593, 660–662, 649–650
See application file for complete search history.

(56) References Cited

U.S. PATENT DOCUMENTS

| | | | | |
|---|---|---|---|---|
| 6,271,747 B1* | 8/2001 | Fendt et al. | ............... | 340/436 |
| 7,027,953 B2* | 4/2006 | Klein | ............... | 702/184 |
| 7,861,593 B2* | 1/2011 | Bougaev et al. | ............... | 73/660 |
| 8,720,272 B2* | 5/2014 | Seuthe | ............... | 73/579 |
| 2006/0229785 A1* | 10/2006 | Baur et al. | ............... | 701/45 |
| 2007/0093987 A1* | 4/2007 | Iida | ............... | G05B 23/024 702/183 |
| 2007/0108749 A1* | 5/2007 | Weidner et al. | ............... | 280/735 |
| 2007/0152433 A1* | 7/2007 | Weichenberger et al. | .... | 280/735 |
| 2008/0243342 A1* | 10/2008 | Breed | ............... | B60R 21/0132 701/45 |
| 2010/0004900 A1 | 1/2010 | Bougaev et al. | | |

FOREIGN PATENT DOCUMENTS

| | | |
|---|---|---|
| DE | 39 37 403 A1 | 11/1989 |
| DE | 42 13 222 A1 | 10/1993 |
| EP | 1 630 634 A2 | 3/2006 |
| EP | 1 978 490 A1 | 10/2008 |
| GB | 2 315 051 A | 1/1998 |
| WO | WO 2004/059399 A1 | 7/2004 |

OTHER PUBLICATIONS

PCT International Search Report—Jun. 20, 2011.

* cited by examiner

*Primary Examiner* — Helen Kwok
(74) *Attorney, Agent, or Firm* — Brinks Gilson & Lione

(57) ABSTRACT

A system for determining vibration characteristics of a motor vehicle having a sensing arrangement (8) adapted to sense vibrations of the vehicle or a vehicle part, and an electronic processing means (11) adapted to apply an algorithm (12) for evaluating signals from the sensing arrangement (8) and for determining vibration characteristics based on the evaluation. The algorithm (12) includes at least one support vector machine SVM (13*a* . . . 13*g*) adapted to output a probability that the current vibration characteristic belongs to a particular pre-set type of vibration characteristic.

15 Claims, 2 Drawing Sheets

SYSTEM FOR DETERMINING VIBRATION CHARACTERISTICS OF A MOTOR VEHICLE

CROSS-REFERENCE TO RELATED APPLICATION

This application claims priority to PCT/EP2010/005550, filed Sep. 9, 2010.

FIELD OF THE INVENTION

The invention relates to a system for determining vibration characteristics of a motor vehicle, having a sensing arrangement adapted to sense vibrations of the vehicle or a vehicle part, and an electronic processing means adapted to apply an algorithm for evaluating signals from the sensing arrangement and for determining wheel-induced vibration characteristics based on said evaluation.

BACKGROUND AND SUMMARY OF THE INVENTION

Road surface conditions, such as a road surface consisting of lose gravel or smooth cobblestones, affect motor vehicles differently compared to road surfaces consisting of smooth asphalt or concrete.

According to DE 42 13 222 A1, the rolling noise of at least one wheel of a vehicle driven over the road surface is detected using a vehicle-mounted sensor. The sensor output signal is band-pass filtered to isolate a frequency range characteristic of road roughness. The effective value of the filtered signal is formed and low-pass filtered. The effective value is associated with a roughness value whilst compensating for the influence of other effects than roughness on the effective value. The roughness value is output to the driver and to control devices in the vehicle.

EP 1 978 490 A1 discloses a system for the recognition of the operating state of a vehicle engine based on the detection of an acoustic noise signal, for example a vibration signal, propagated in a compartment of the vehicle. The system provides for a comparison of a descriptor vector of the detected signals, having at least data indicative of the frequency and energy components of the signals, with a plurality of reference descriptor vectors indicative of known operating conditions acquired in a learning phase. The system furthermore provides for discriminating and recognizing a first class of signals indicative of an operating condition and a second class of signals indicative of an inoperative condition of the vehicle engine.

The object of the invention is to provide a robust and effective system for determining, with adequate processing resources, vibration characteristics of a motor vehicle.

The invention solves this object with the features described herein. The use of at least one support vector machine (SVM) is a robust and effective means for classifying the current vibration characteristic into at least one particular pre-set type of vibration characteristic. Support vector machines do not require excessive processing resources and can therefore be incorporated into vehicle-mounted electronic signal processing units with usual hardware and processing capabilities.

A support vector machine (SVM) is a mathematical model which has been obtained by training using a plurality of training data sets, each marked as belonging to a particular category or not. The SVM is then able to predict for an input new data set whether this new data set falls into this particular category or not. More specifically, the SVM is able to output a probability that the new data set falls into the particular category.

In a preferred application, the algorithm is adapted to determine wheel-induced vibration characteristics of a moving motor vehicle generated due to the rolling of a vehicle wheel on the ground. The invention may advantageously be used for classifying the current road surface as belonging to at least one particular pre-set type of road surface, for example, smooth road, cobbled pavement, concrete slabs, grass, and so on. However, the invention is not limited to this application. In addition or alternatively, vibrations originating from a vehicle part may be determined for diagnosis of the vehicle part. For example, wheel-induced vibration characteristics may be determined in order to detect unusual wheel conditions which may require special attention by the driver, like low tire pressure, unbalanced masses or tire types; or mounted snow chains. The invention is also applicable to determine vibrations characteristics induced by other vehicle parts such as the motor, gearbox or bearings. This may be useful for example in motor or gear-box diagnosis, or for detecting defect vehicle parts.

Preferably the classifying algorithm comprises a plurality of support vector machines, each of which is adapted to output a probability that the current vibration characteristic belongs to a particular one of different pre-set types of vibration characteristics. In this case, a plurality of different pre-set types of vibration characteristics can be identified. The support vector machines are preferably connected in parallel to each other. A decision means may advantageously be provided for determining the maximum probability among said probabilities output by said support vector machines.

Preferably, the sensing arrangement includes at least one vibration sensor adapted to detect structure-borne vibrations transmitted by the vehicle chassis. In a preferred embodiment, a vehicle impact sensor, in particular a frontal impact safing sensor, alternatively a side impact safing sensor, may be used as the vibration sensor. In this case, an additional vibration sensor is not required. Preferably the vibration sensor is positioned in a central region of the vehicle as seen from above. In this case, the vibration sensor is sensitive to vibrations from many different vehicle parts, for example from all four wheels.

Alternatively or in addition to the at least one vibration sensor, preferably at least one sound sensor adapted to detect air-borne acoustic rolling noise is provided. In this case, the sound sensor may preferably be used as a safing sensor to a vibration sensor of said sensing arrangement.

Information from the above described algorithm may preferably be used to control a vehicle safety means, as electronic stability control (ESC) system, anti-slipping system, active damping system and/or one or more passenger restraint systems. Alternatively or in addition, information from the above described algorithm may preferably be used to alert the driver by suited visual, acoustical or haptical warning means.

BRIEF DESCRIPTION OF THE DRAWINGS

In the following the invention shall be illustrated on the basis of preferred embodiments with reference to the accompanying drawings, wherein.

DETAILED DESCRIPTION OF THE INVENTION

Figure 1:
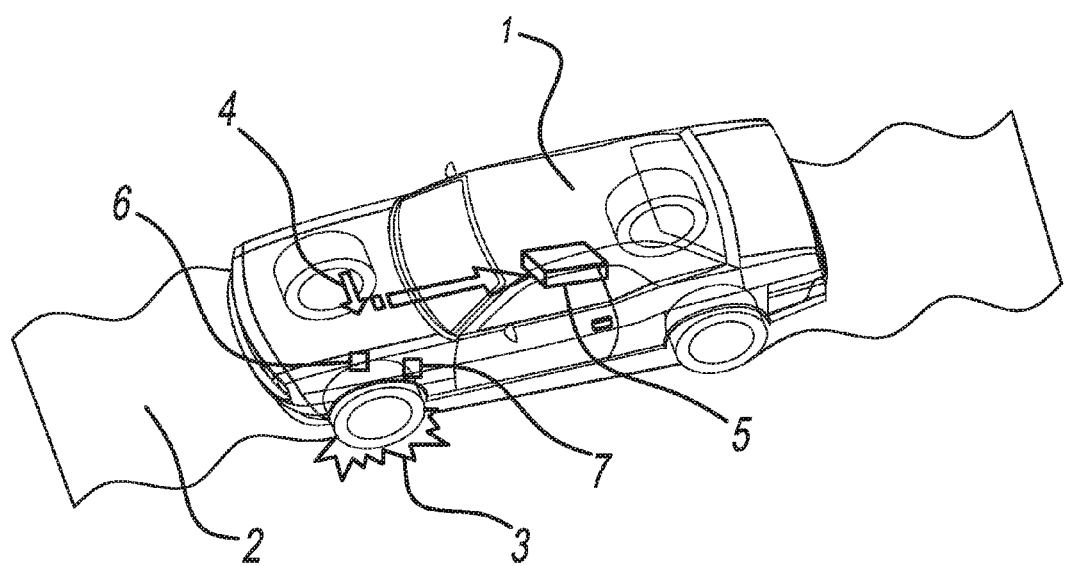
FIG. 1 shows a schematic perspective view of a motor vehicle.
Figure 2:
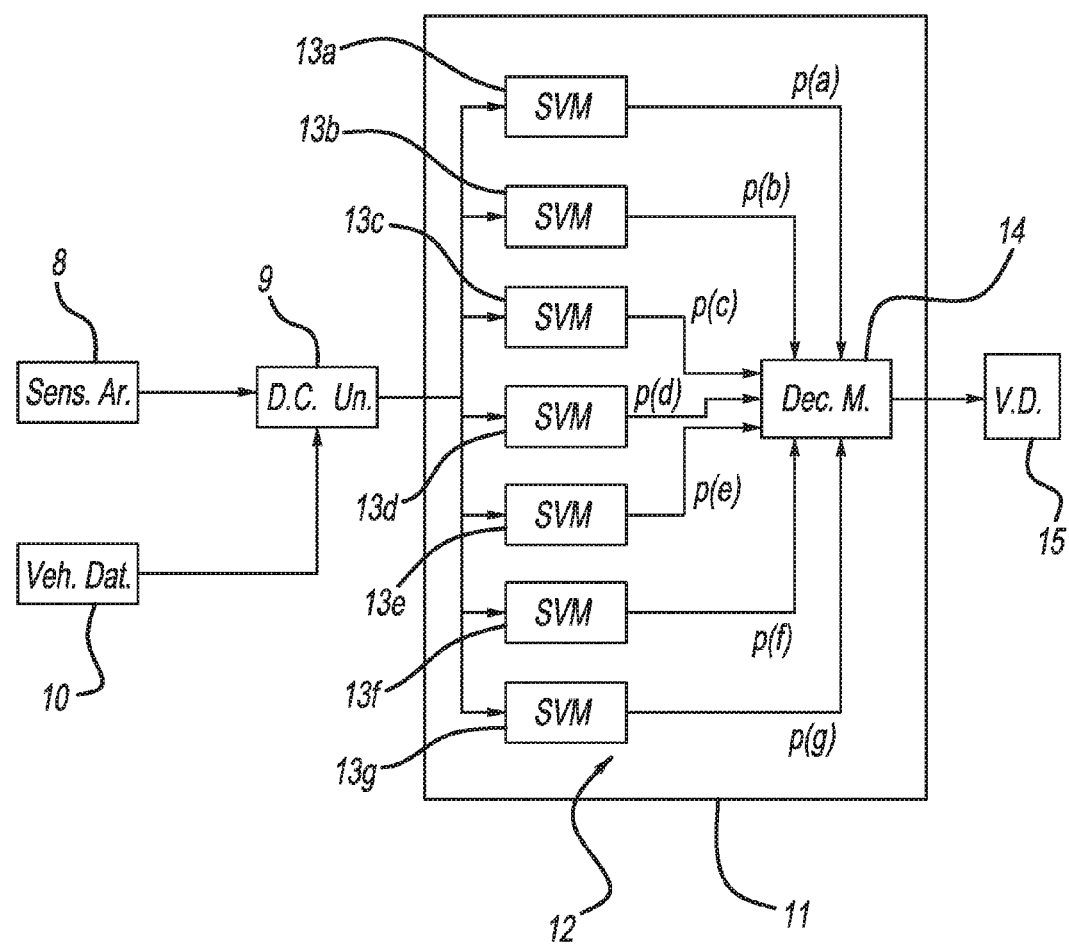
FIG. 2 shows a schematic view of a system for determining road surface characteristics of a moving motor vehicle.

The vehicle 1 is driving on a ground or road with a specific type of surface 2, for example smooth asphalt, loose gravel, smooth cobblestones, concrete, grass, and so on. The wheels 3 rolling on the ground surface 2 generate a noise, or more generally vibrations, which are characteristic of the particular surface type the vehicle is driving on. The rolling noise is transmitted by or through the vehicle structure, in particular the chassis, as structure-borne vibrations which are indicated in FIG. 1 by arrows 4.

A vibration sensor 5 for detecting the structure-borne vibrations may be mounted in the vehicle 1 in a fixed relation to the vehicle chassis. The vibration sensor may in particular be an accelerometer. Other sensor types are possible, for example a piezo-electric sensor. The vibration sensor 5 is preferably mounted centrally in the vehicle as seen from above, in order to be sensitive to vibrations generated by all four wheels 3. The vibration sensor 5 may have a predominant vertical component which may enhance the sensivity to rolling vibrations; however, this is not strictly necessary. The vibration sensor 5 may for example be mounted on the vehicle chassis floor and may be located in or above the passenger compartment of the vehicle 1. Preferably the vibration sensor 5 is an impact sensor, in particular a MEMS accelerometer, such that additional sensors for detecting the rolling vibrations are not required. Rolling noise is typically in the low frequency range while impact vibrations are in the high frequency range, therefore it is possible to discriminate between these different forms of vibrations. The vibration sensor 5 may in particular be the frontal impact safing sensor. However, another impact sensor and/or impact safing sensor may be used as vibration sensor 5, for example a side impact safing sensor.

At least one sound sensor 6, 7 for detecting the rolling noise in the form of air-borne vibrations may be mounted in the vehicle. The sound sensor 6, 7 may in particular be a microphone and may be mounted for example on a part of the vehicle suspension, in particular on the suspension dome between the front or rear wheels, here sound sensor 6, and/or in a wheel house, and sound sensor 7.

The sensors 5, 6, and 7 for detecting the rolling vibrations of the vehicle form a vibration sensing arrangement 8. Data from the vibration sensing arrangement 8 may be pre-processed in a data conditioning unit 9. The data conditioning unit 9 is in particular adapted to perform suited filtering and/or fast Fourier transform FFT analysis to the data provided by the vibration sensing arrangement 8, such that the output of the data conditioning unit 9 comprises time-domain data, such as average value, RMS value, standard deviation and so on, and frequency domain data. Expediently, the data conditioning unit 9 has access to other vehicle data 10 in particular via the vehicle CAN bus. In particular, the data conditioning unit 9 has access to vehicle speed data, and is thus adapted to compensate the signals provided by the vibration sensing arrangement 8 for the vehicle speed. Preferably the data conditioning unit 9 is a separate data processing unit, like a digital signal processor DSP, which may be specifically adapted in particular to FFT processing. However, it is also possible to perform the above mentioned functions performed in the data conditioning unit 9 in the signal processing unit 11 described in the following.

The pre-processed data output by the data conditioning unit 9 is provided to a signal processing unit 11 where processing for classifying the rolling vibrations as measured by the vibration sensing arrangement 8 is performed. The digital signal processing unit 11 includes correspondingly programmed software for carrying out a classifying algorithm 12 to be described in the following.

The classifying algorithm 12 comprises a plurality of support vector machines (SVM) 13a . . . 13g, here seven, connected in parallel and each being fed with input data from the vibration sensing arrangement 8. The number of SVMs 13a-g corresponds to the number of different ground surface types which the classifying algorithm 12 should be able to discriminate. In the present example, the classifying algorithm 12 should be able to discriminate between seven types of ground or road surface, namely for example (a) smooth road, (b) cobbled pavement, (c) fine lateral gutter, (d) concrete slabs road, (e) grass pavement, (f) pothole road and (g) gravely road. Consequently, the classifying algorithm 12 comprises seven corresponding SVMs 13a . . . 13g. Each SVM SVMs 13a . . . 13g evaluates the correlation of suited features of the signal from the vibration sensing arrangement 8, e.g. frequency content, amplitudes, RMS value and/or any other suitable parameter, with reference values via mathematical hyper planes which have been obtained by off-line training of the SVMs 13a . . . 13g by the developer of the classifying algorithm 12. In this manner, each SVM 13a . . . 13g is adapted to calculate and output a corresponding probability p(a) . . . p(g) that the road surface is belonging to the specific type (a) smooth road . . . (g) gravely road associated with the corresponding SVM 13a . . . 13g.

All probabilities p(a) . . . p(g) calculated by the SVMs 13a . . . 13g are input to a decision means 14 provided in the signal processing unit 11. The decision means 14 preferably includes a maximum probability means which determines the maximum probability among all input probabilities p(a) . . . p(g). The decision means 14 then expediently decides that the current road surface is of the type associated with that SVM 13i which outputs the highest probability value p(i), where i=a, b, c, d, e, f, or g. The current road surface type may then be output from the signal processing unit 11.

The decision means 14 may involve other conditions for determining the current road surface type. For example, the decision means 14 may determine that the current road surface type is different from all predetermined road surface types recognizable by the algorithm 12 if the highest probability p(i) lies below a predetermined threshold. In this case, "unknown road surface type" may be output from the decision means 14, or the output of a road surface type may be suppressed altogether. Alternatively, the decision means 14 may determine and output more than one road surface types possible to be present. For example, all probabilities p(i) lying above a predetermined threshold may considered relevant. Alternatively, for example, all probabilities p(i) lying within a predetermined interval below the maximum probability may be considered relevant. However, if there are too many possible road surface types with high probability, the output may be "unknown road type surface", or the output of a road surface type may be suppressed altogether.

Depending on the determined road surface type, a vehicle device 15, in particular a safety means like the ESC system, the anti-slipping system, the active damping system and/or occupant restraint systems may be controlled. For example, triggering thresholds of an occupant restraint system may be adjusted to the determined road surface type or condition. Information about the determined road surface type may also be used to warn the vehicle driver by a suitable optical, acoustical and/or haptical alerting means.

The signal processing unit 11 may be a separate unit or any other vehicle-mounted signal processing unit. For example, a signal processing unit used for the control of occupant restraint systems may contain the classifying algorithm 12, thus forming the signal processing unit 11. Preferably, the vibration sensor 5 or the vibration sensing arrangement 8 is arranged in or adjacent to the signal processing unit 11; however, this is not necessarily the case.

Preferably, the input data for the SVMs 13a . . . 13g is based on signals from the at least one vibration sensor 5 for measuring structure-borne vibrations in the vehicle chassis. In this case, the signals from the at least one sound sensor 6, 7 can preferably be used for safing/confirming the classification based on signals from the at least one vibration sensor 5. This safing function can for example be carried out in the decision means 14. However, the sound sensors 6, 7 are only optional and may in some embodiments be dispensed with. It is also possible in some embodiments that the input data for the SVMs 13a . . . 13g is based on signals from the at least one sound sensor 6, 7 alternatively or in addition to signals from the at least one vibration sensor 5.

While the above description constitutes the preferred embodiment of the present invention, it will be appreciated that the invention is susceptible to modification, variation and change without departing from the proper scope and fair meaning of the accompanying claims.

The invention claimed is:

1. A system for determining vibration characteristics of a motor vehicle, comprising a sensing arrangement adapted to sense vibrations of the vehicle or of a vehicle part, and an electronic processing means adapted to apply an algorithm for evaluating signals from the sensing arrangement and for determining the vibration characteristics based on the evaluation, the algorithm includes at least one support vector machine adapted to output a probability that a second vibration characteristic belongs to a particular pre-set type of the vibration characteristics; and the support vector machine is configured to output a probability that a current vibration characteristic belongs to a particular one of different pre-set types of vibration characteristics.

2. The system as claimed in claim 1, further comprising wherein the algorithm is adapted to determine the vibration characteristics in the form of a wheel-induced vibration characteristic of the motor vehicle while moving generated due to the rolling of a vehicle wheel on the ground.

3. The system as claimed in claim 2, further comprising wherein the support vector machine is adapted to output a probability that a current road surface belongs one of the particular pre-set road surface type based upon the wheel-induced vibration characteristic.

4. The system as claimed in claim 1 wherein the algorithm comprises a plurality of the support vector machines, wherein each of the plurality of support vector machines is adapted to output a probability that the sensed vibration characteristic belongs to the particular pre-set type of vibration characteristics.

5. The system as claimed in claim 4, further comprising wherein the plurality of support vector machines are connected in parallel to each other.

6. The system as claimed in claim 4 further comprising a decision means adapted for determining the maximum probability among the probability outputs of the support vector machines.

7. The system as claimed in claim 1 wherein the sensing arrangement comprises at least one vibration sensor adapted to detect vibrations transmitted by the motor vehicle chassis.

8. The system as claimed in claim 7, wherein further comprising the vibration sensor is positioned in a central region of the motor vehicle.

9. The system as claimed in claim 7 further comprising the vibration sensor is an accelerometer mounted in fixed relation to the vehicle chassis.

10. The system as claimed in claim 7 further comprising wherein the vibration sensor is a vehicle impact sensor.

11. The system as claimed in claim 1 wherein the sensing arrangement comprises at least one sound sensor adapted to detect acoustic rolling noise generated due to the rolling of a vehicle wheel on the ground.

12. The system as claimed in claim 11 further comprising wherein the sound sensor is used as a safing sensor to a vibration sensor of the sensing arrangement.

13. The system as claimed in claim 1 further comprising wherein the algorithm is adapted to compensate signals from the sensing arrangement for the vehicle speed using available vehicle speed data.

14. The system as claimed in claim 1 further comprising wherein information from the algorithm is used to control a means for vehicle safety or to alert the driver of the motor vehicle.

15. The system as claimed in claim 1 wherein the algorithm is adapted to determine the vibration characteristic of a vehicle part for diagnosis of the vehicle part.

* * * * *